United States Patent [19]

Kuriyama et al.

[11] Patent Number: 5,366,420
[45] Date of Patent: Nov. 22, 1994

[54] AUTOMATIC TRANSMISSION CONTROL SYSTEM

[75] Inventors: Minoru Kuriyama; Shinya Kamada; Shigeru Nagayama; Takayuki Sumimoto, all of Hiroshima, Japan

[73] Assignee: Mazda Motor Corporation, Hiroshima, Japan

[21] Appl. No.: 47,753

[22] Filed: Apr. 19, 1993

[30] Foreign Application Priority Data

Apr. 20, 1992 [JP] Japan .................. 4-128172
Aug. 27, 1992 [JP] Japan .................. 4-254009

[51] Int. Cl.$^5$ .................. B60K 41/00; F16D 25/14
[52] U.S. Cl. .................. 475/129; 192/85 R; 192/109 F
[58] Field of Search .................. 192/109 F, 85 R; 475/127, 128, 129

[56] References Cited

U.S. PATENT DOCUMENTS

| | | | |
|---|---|---|---|
| 3,540,558 | 11/1970 | Lamburn | 475/129 X |
| 3,703,228 | 11/1972 | Chana | 192/85 R |
| 4,674,364 | 6/1987 | Shindo et al. | 475/129 X |
| 4,709,597 | 12/1987 | Yasue et al. | 475/129 X |
| 5,109,731 | 5/1992 | Iwatsuki et al. | |
| 5,211,081 | 5/1993 | Bota et al. | |

FOREIGN PATENT DOCUMENTS 61-99745  5/1986  Japan .

Primary Examiner—Michael Koczo
Attorney, Agent, or Firm—Sixbey, Friedman, Leedom & Ferguson

[57] ABSTRACT

An automatic transmission has a hydraulic circuit which controls supply of engaging pressures to friction coupling elements. The hydraulic circuit has a first hydraulic passage having a hydraulic pressure control valve including an accumulator, a second hydraulic passage which is provided in parallel to the first hydraulic passage and is provided with an electrically controlled hydraulic pressure control valve, and a shift valve which selectively connects a predetermined friction coupling element to the first hydraulic passage or the second hydraulic passage.

6 Claims, 10 Drawing Sheets

FIG. 10

⟨NORMAL STATE⟩

ENGAGING PRESSURE (2nd CHAMBER 34₂)

ENGAGING PRESSURE (1st CHAMBER 32₁)

LINEAR OUTPUT PRESSURE — Max

| | | |
|---|---|---|
| 4th S/V | OFF | ON |
| 5th S/V | OFF | OFF |

FIG. 11

⟨4th S/V ABNORMAL⟩

ENGAGING PRESSURE (2nd CHAMBER 34₂)

ENGAGING PRESSURE (1st CHAMBER 32₁)

LINEAR OUTPUT PRESSURE

| | | |
|---|---|---|
| 4th S/V | OFF | OFF |
| 5th S/V | OFF | ON |

FIG. 12

⟨5th S/V ABNORMAL⟩

LINEAR (Min)

LINEAR (Max) ENGAGING PRESSURE (1st CHAMBER 32₁)

LINEAR OUTPUT PRESSURE — Max

| | | |
|---|---|---|
| 4th S/V | OFF | ON |
| 5th S/V | ON | ON |

AUTOMATIC TRANSMISSION CONTROL SYSTEM

BACKGROUND OF THE INVENTION

1. Field of the Invention

This invention relates to an automatic transmission control system for a vehicle.

2. Description of the Prior Art

In an automatic transmission, a torque convertor and a transmission mechanism are connected and the gear is shifted by selectively engaging and disengaging a plurality of friction coupling elements to change the power transmission path through the transmission mechanism. There has been known an automatic transmission in which the transmission mechanism comprises a main transmission mechanism and a sub transmission mechanism so that the speed of the output of the main transmission mechanism is further changed by the sub transmission mechanism in order to obtain an increased number of gear speeds.

In such an automatic transmission, the main transmission mechanism and the sub transmission mechanism sometimes shift simultaneously with each other. In such a case, when their shifting actions do not synchronize with each other, an uncomfortable torque shock occurs. When their shifting actions are reverse to each other, i.e., one upshifts and the other downshifts, the torque shock is more significant. In order to overcome the problem, it has been proposed, for instance, in Japanese Unexamined Patent Publication No. 61(1986)-99745 to cause the sub transmission mechanism to initiate and complete a downshift during an upshift of the main transmission mechanism.

However, the torque generated when the main and sub transmission mechanisms shift in opposite directions cannot be sufficiently suppressed by simply causing one of the main and sub transmission mechanisms to initiate and complete a shifting action during that of the other, but it is necessary to harmonize the change in the gear ratio in one of the transmission mechanisms with that in the other transmission mechanism in order to efficiently suppress the torque shock.

This may be realized by employing an electrically controlled hydraulic control means such as a linear solenoid valve or a duty solenoid valve to control engagement and disengagement of a friction coupling element in one transmission mechanism, detecting the gear ratio of the transmission mechanism and feedback-controlling the engagement and disengagement of the friction coupling element so that the gear ratio of the transmission mechanism changes in harmony with change in the gear ratio of the other transmission mechanism.

However, use of such an electrically controlled hydraulic control means gives rise to the following problem. That is, when such a hydraulic control means is used, the control hydraulic pressure is apt to vary or fluctuate. Further since it is generally designed to handle a relatively small amount of working oil, its controlling accuracy deteriorates when the amount of the working oil is large. Accordingly, such an electrically controlled hydraulic control means, if may be useful during the gear-shifting which requires the feedback control described above, can adversely affect the other gear-shiftings in which the friction coupling element is involved.

SUMMARY OF THE INVENTION

In view of the foregoing observations and description, the primary object of the present invention is to provide an automatic transmission control system in which gear-shifting can be smoothly effected without torque shock irrespective of whether it involves shifts of the main and sub transmission mechanisms in opposite directions.

In accordance with the present invention, there is provided a control system for an automatic transmission having hydraulic circuit which controls supply of engaging pressure to friction coupling elements characterized in that said hydraulic circuit comprises a first hydraulic passage having a hydraulic pressure control means including an accumulator, a second hydraulic passage which is provided in parallel to the first hydraulic passage and is provided with an electrically controlled hydraulic pressure control means, and a shift valve which selectively connects a predetermined friction coupling element to the first hydraulic passage or the second hydraulic passage.

With this arrangement, when the predetermined friction coupling element is connected to the first hydraulic passage, supply and drain of the engaging pressure to and from the friction coupling element can be effected in a controlled manner by virtue of the accumulator and when the friction coupling element is connected to the second hydraulic passage, supply and drain of the engaging pressure to and from the friction coupling element can be electrically controlled. Accordingly, by using the first hydraulic passage in the case of a gear-shifting where a large amount of working oil must be controlled or variation and/or fluctuation in the pressure is especially undesirable and using the second hydraulic passage in the case of a gear-shifting where the change in the hydraulic pressure must be controlled with time, supply and drain of the engaging pressure to and from the friction coupling element can be optimally controlled in the gear-shifting of either type.

For example, when the automatic transmission has a main transmission mechanism and a sub transmission mechanism, by connecting the friction coupling element which is involved in a predetermined gear-shifting where the main transmission mechanism and the sub transmission mechanism shift in opposite directions to the second hydraulic passage during the predetermined gear-shifting and to the first hydraulic passage during gear-shiftings other than the predetermined gear-shifting, the gear-shifting action in the sub transmission mechanism can be progressed in step with that in the main transmission mechanism in the predetermined gear-shifting without deteriorating the control accuracy in the other gear-shiftings.

BRIEF DESCRIPTION OF THE DRAWINGS

FIG. 10 is a time chart showing the change in the engaging pressures supplied to the second hydraulic pressure chamber of the deceleration brake and the first hydraulic pressure chamber of the direct connection clutch when the solenoid valves are all normal, FIG. 11 is a view similar to FIG. 10 but when the fourth on-off solenoid valve cannot be turned on, and FIG. 12 is a view similar to FIG. 10 but when the fifth on-off solenoid valve cannot be turned off.

DESCRIPTION OF THE PREFERRED EMBODIMENT

Figure 1:
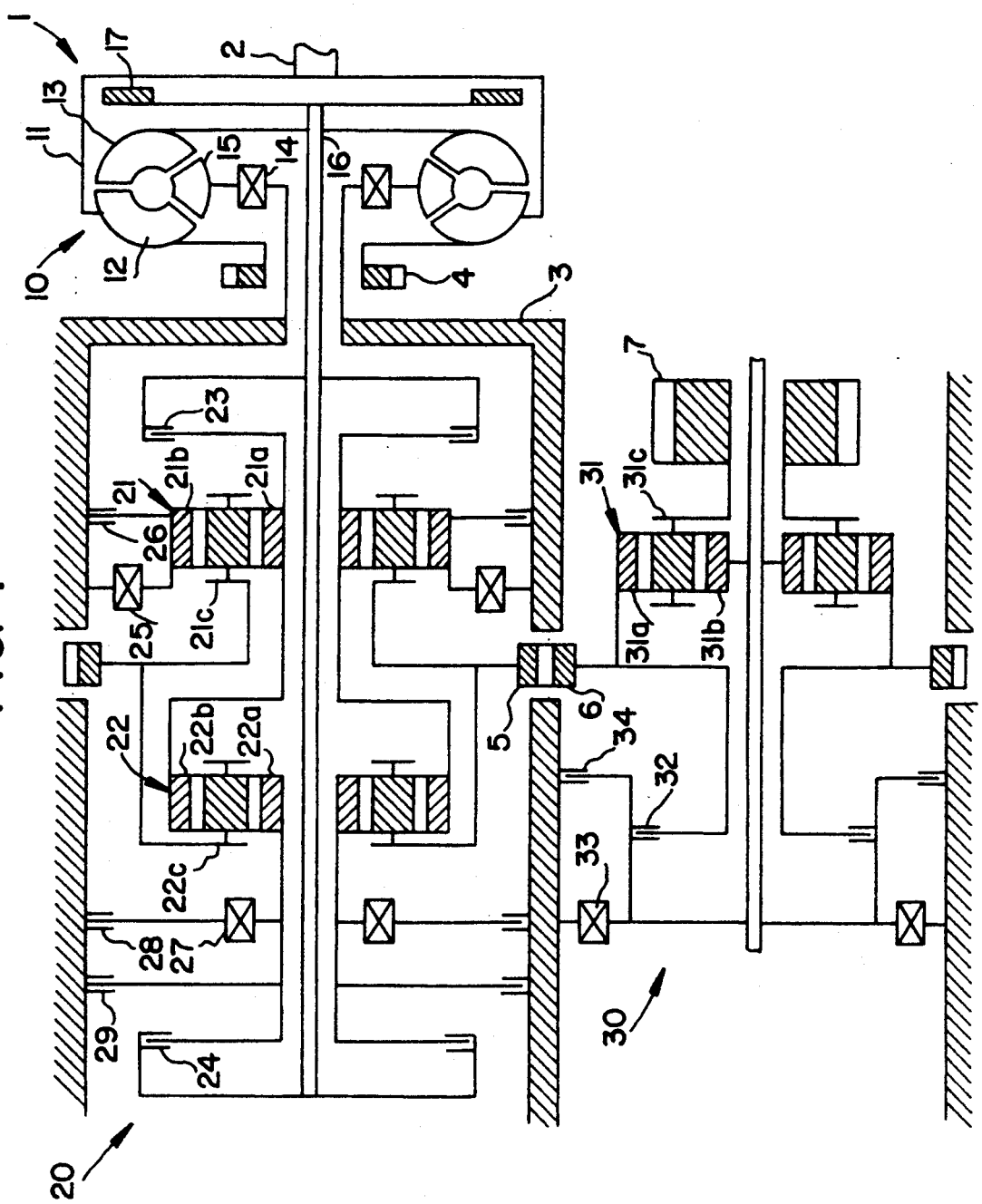
FIG. 1 is a schematic view showing an automatic transmission in accordance with an embodiment of the present invention.
Figure 2:
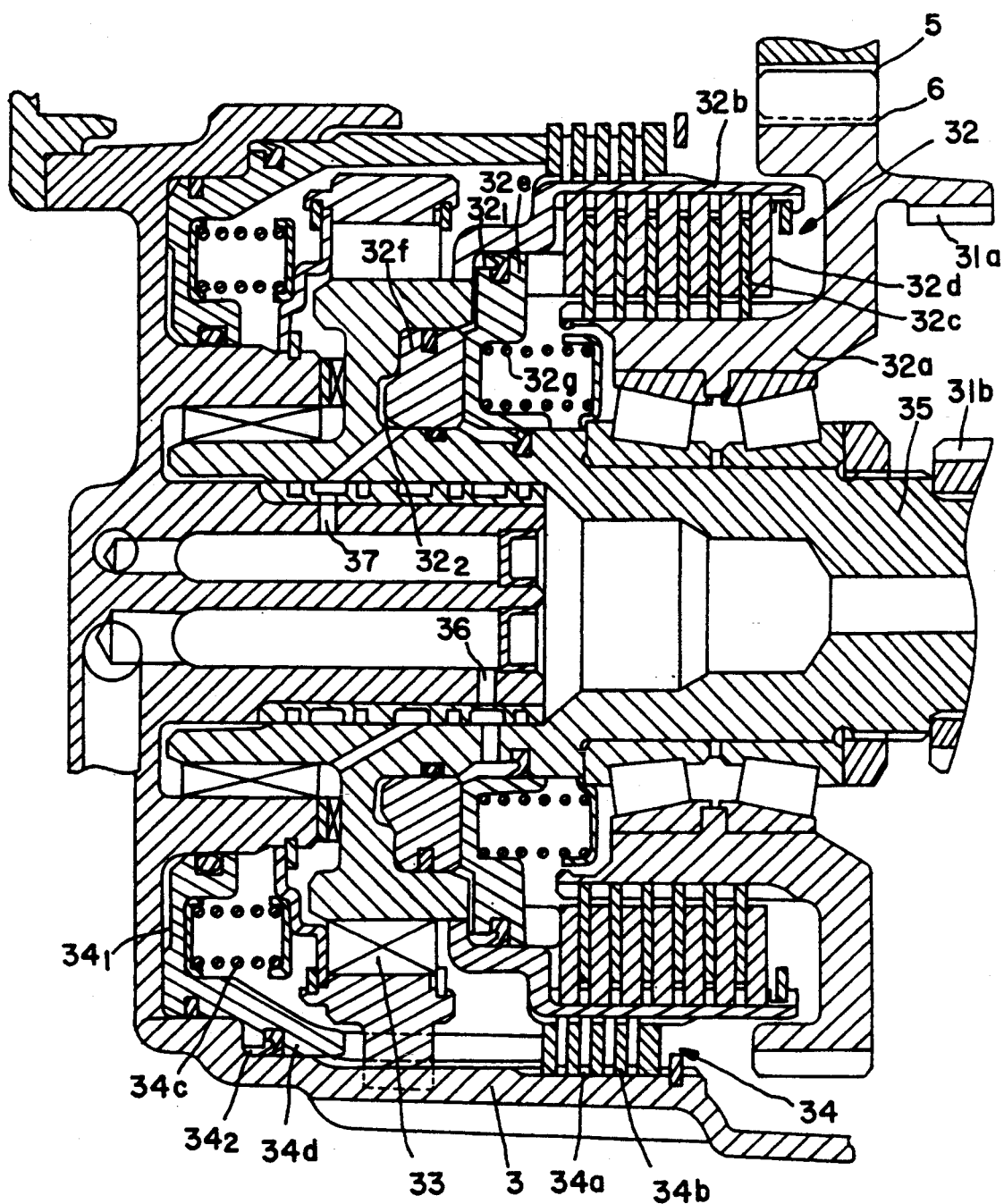
FIG. 2 is a cross-sectional view showing the sub transmission mechanism of the automatic transmission.

In FIG. 1, an automatic transmission 1 comprises a torque convertor 10, a main transmission mechanism 20 having a central axis in alignment with the axis of the torque convertor 10 and a sub transmission mechanism 30 having a central axis parallel to the axes of the torque convertor 10 and the main transmission mechanism 20.

The torque convertor 10 comprises a casing 11 connected to an engine output shaft 2, a pump 12 integral with the casing 11, a turbine 13 opposed to the pump 12 to be driven by working oil from the pump 12, a stator 15 disposed between the pump 12 and the turbine 13 and supported on a transmission casing 3 by way of a one-way clutch 14, a convertor output shaft 16 connected to the turbine 13 and a lockup clutch 17 which directly connects the output shaft 16 to the engine output shaft 2 by way of the casing 11.

An oil pump 4 is disposed between the torque convertor 10 and the main transmission mechanism 20 and is driven by the engine output shaft 2 by way of the torque convertor 10.

The main transmission mechanism 20 comprises a front planetary gear mechanism 21 provided on the convertor output shaft 16 and a rear planetary gear mechanism 22 provided on the convertor output shaft 16 on the side of the front planetary gear mechanism 21 remote from the torque convertor 10. The convertor output shaft 16 is connected to a sun gear 21a of the front planetary gear mechanism 21 by way of a forward clutch 23 and to a sun gear 22a of the rear planetary gear mechanism 22 by way of a direct connection clutch 24. The sun gear 21a of the front planetary gear mechanism 21 is connected to a ring gear 22b of the rear planetary gear mechanism 22.

A first one-way clutch 25 and a low-reverse brake 26 are provided in parallel between the transmission casing 3 and a ring gear 21b of the front planetary gear mechanism 21, and a second one-way clutch 27 and a 3-4 brake 28 are provided in series between the sun gear 22a of the rear planetary gear mechanism 22 and the transmission casing 3. Further a coast brake 29 for engine brake is provided between the sun gear 22a of the rear planetary gear mechanism 22 and the transmission casing 3 in parallel to the second one-way clutch 27 and the 3-4 brake 28. Pinion carriers 21c and 22c of the front and rear planetary gear mechanisms 21 and 22 are connected to each other, and an intermediate gear 5 which transmits power from the main transmission mechanism 20 to the sub transmission mechanism 30 is connected to the pinion careers 21c and 22c.

The main transmission mechanism 20 provides three forward speeds, i.e., a low gear speed, a middle gear speed and a high gear speed, and one reverse.

That is, in the state where the forward clutch 23 only is engaged, the power from the torque convertor output shaft 16 is input into the sun gear 21a of the front planetary gear mechanism 21, and the revolution of the torque convertor output shaft 16 is reduced at a large reduction ratio and then transmitted from the pinion carrier 21c of the front planetary gear mechanism 21 to the intermediate gear 5 since the ring gear 21b is held stationary on the transmission casing 3 by way of the first one-way clutch 25, whereby the low gear speed is provided.

When the 3-4 brake is applied (engaged) when the main transmission mechanism 20 is in the low gear speed, the sun gear 22a of the rear planetary gear mechanism 22 is held stationary by way of the second one-way clutch 27, whereby the power input into the ring gear 22b of the rear planetary gear mechanism 22 from the torque convertor output shaft 16 through the forward clutch 23 and the sun gear 21a of the front planetary gear mechanism 21 is reduced at a reduction ratio smaller than the reduction ratio of the low gear speed and transmitted to the intermediate gear 5 through the pinion carrier 22c. This provides the middle gear speed.

When the 2-4 clutch 24 is engaged when the main transmission mechanism 20 is in the middle gear speed, the power from the convertor output shaft 16 is input into the ring gear 22b of the rear planetary gear mechanism 22 by way of the forward clutch 23 and the sun gear 21a of the front planetary gear mechanism 21 and to the sun gear 22a of the rear planetary gear mechanism 22 by way of the direct connection clutch 24. Accordingly, the whole rear planetary gear mechanism 22 rotates and the revolution at the same gear speed as the convertor output shaft 16 is output from the pinion carrier 22c to the intermediate gear 5, whereby the high gear speed is provided.

When the forward clutch 23 is disengaged and the direct connection clutch 24 and the low-reverse brake 26 are engaged, the power from the convertor output shaft 16 is input into the sun gear 22a of the rear planetary gear mechanism 22 and at the same time the ring gear 21b of the front planetary gear mechanism 21 is held stationary, whereby the revolution of the convertor output shaft 16 is reversed and out from the pinion carriers 21c and 22c of the front and rear planetary gear mechanisms 21 and 22 to the intermediate gear 5, thereby providing the reverse.

Though, in a deceleration with the main transmission mechanism 20 in the low or middle gear speed, the first and second one-way clutches 25 are disengaged and engine brake effect cannot be obtained, in the engine brake range, the low-reverse brake 26, which is provided in parallel to the first one-way clutch 25, is engaged in the case of the low gear speed and the coast brake 29 which is provided in parallel to the second one-way clutch 27 is engaged in the case of the middle gear speed, whereby a low gear speed and a middle gear speed, which can provide an engine brake effect, can be obtained.

The sub transmission mechanism 30 has a single planetary gear mechanism 31, and an intermediate gear 6 which is normally in mesh with the intermediate gear 5 in the main transmission mechanism 20 is connected to a ring gear $31a$ of the planetary gear mechanism 31. A direct connection clutch 32 is provided between the sun gear $31b$ and the ring gear 31 of the planetary gear mechanism 31. A third one-way clutch 33 and a deceleration brake 34 are provided in parallel to each other between the transmission casing 3 and the sun gear $31b$ of the planetary gear mechanism 31. An output gear 7 is connected to a pinion carrier $31c$ of the planetary gear mechanism 31. The power is transmitted from the output gear 7 to the left and right driving wheels (not shown) by way of a differential (not shown). The sub transmission mechanism 30 provides low and high forward gear speeds.

That is, in the state where the direct connection clutch 32 is disengaged, the sun gear $31b$ of the planetary gear mechanism 31 is held stationary by the third one-way clutch 33 or the deceleration brake 34, and the power input into the ring gear $31a$ of the planetary gear mechanism 31 from the intermediate gear 6 is reduced in speed and output to the output gear 7 through the pinion carrier $31c$, there by providing the low gear speed. If the deceleration brake is in the engaged state in this case, the sub transmission mechanism 30 provides an engine brake effect.

When the direct connection clutch 32 is in the engaged state with the deceleration brake 34 disengaged, the ring gear $31a$ and the sun gear $31b$ of the planetary gear mechanism 31 are connected and the power from the intermediate gear 6 is output to the output gear 7 through the pinion carrier $31c$ as it is in speed, thereby providing the high gear speed (lockup).

Since the main transmission mechanism 20 provides three forward speeds and one reverse and the sub transmission mechanism 30 provides two speeds, the whole automatic transmission 1 can provide six forward speeds and one reverse (as the combination of the reverse of the main transmission mechanism 20 and the low gear speed of the sub transmission mechanism 30 where the deceleration brake 34 is engaged). In this particular embodiment, five of the six forward speeds are utilized.

The clutches and brakes are selectively engaged or disengaged in the manner shown in the following table 1. In table 1, ◯ indicates the element is engaged and (◯) indicates that the element is engaged only in the engine brake range.

The direct connection clutch 32 of the sub transmission mechanism 30 comprises a hub $32a$ with which the intermediate gear 6 and the ring gear $31a$ of the planetary gear mechanism 31 are integrally formed, a shaft 35 to which the sun gear $31b$ of the planetary gear mechanism 31 is fixed, a drum $32b$ formed integrally with the shaft 35, a plurality of driving friction plates $32c$ and a plurality of driven friction plates $32d$ which are alternately arranged between the hub $32a$ and the drum $32b$, a first piston $32e$ which has a large diameter and a large pressure receiving area and is positioned behind the friction plates $32c$ and $32d$ and a second piston $32f$ which has a small diameter and a small pressure receiving area and is positioned behind the first piston $32e$. Reference numeral $32g$ denotes a return spring for the first and second pistons $32e$ and $32f$.

A first hydraulic pressure chamber $32_1$ is provided behind the first piston $32e$ and an engaging pressure is introduced into the first hydraulic pressure chamber $32_1$ through an oil passage 36, and a second hydraulic pressure chamber $32_2$ is provided behind the second piston $32f$ and an engaging pressure is introduced into the second hydraulic pressure chamber $32_2$ through an oil passage 37. A larger engaging force is obtained when the engaging pressure is introduced into the first hydraulic pressure chamber $32_1$ than when the engaging pressure is introduced into the second hydraulic pressure chamber $32_2$ so long as the engaging pressures introduced are the same.

The deceleration brake 34 has a plurality of driving and driven friction plates $34a$ and $34b$ which are alternately arranged between the drum $32b$ of the direct connection clutch 32 and the transmission casing 3, and a piston $34d$ which causes the friction plates $34a$ and $34b$ to engage with each other overcoming the force of a return spring $34c$. First and second hydraulic pressure chambers $34_1$ and $34_2$ are provided behind the piston $34d$ coaxially with each other with the first hydraulic pressure chamber $34_1$ having a larger pressure receiving area and positioned inside. A larger engaging force is obtained when the engaging pressure is introduced into the first hydraulic pressure chamber $34_1$ than when the engaging pressure is introduced into the second hydraulic pressure chamber $34_2$ so long as the engaging pressures introduced are the same.

A hydraulic circuit 40 which selectively engages and disengages the friction coupling elements in the manner shown in table 1 in order to shift the automatic transmission 1 according to the running condition of the vehicle or the driver's demand will be described, hereinbelow.

Figure 3:
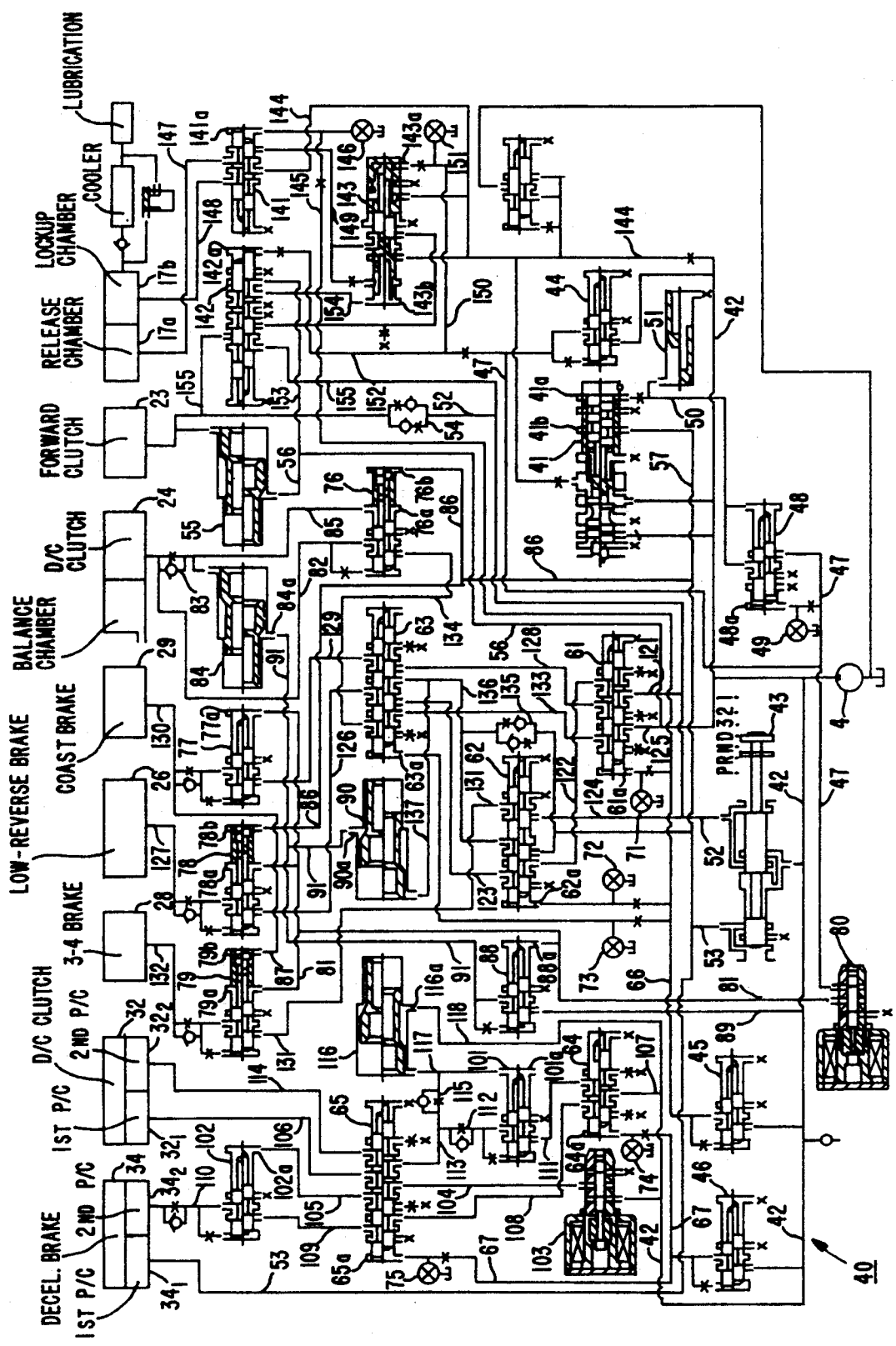
FIG. 3 shows the hydraulic circuit of the automatic transmission.

As shown in FIG. 3, the hydraulic circuit 40 has a regulator valve 41 which regulates the pressure of the working oil discharged from the oil pump 4 to a predetermined line pressure. The line pressure is supplied through a main line 42 to a manual valve 43 and to first to third reducing valves 44, 45 and 46 for generating various main control pressures.

The main control pressure reduced to a predetermined pressure by the first reducing valve 44 is supplied to a modulator valve 48 through a line 47. A control port $48a$ of the modulator valve 48 is supplied with a control pressure regulated by a duty solenoid valve 49, and a modulator pressure is produced from the main control pressure according to the duty ratio of the duty solenoid valve 49 (the ratio of time the solenoid valve 49 is on). The modulator pressure thus produced is supplied to a first pressure increase port $41a$ of the regulator valve 41 by way of a line 50, whereby the line

TABLE 1

| | main transmission mechanism | | | | | | | sub transmission mechanism | | | |
|---|---|---|---|---|---|---|---|---|---|---|---|
| speed | D/C clutch | forward clutch | 3-4 brake | coast brake | L-R brake | 1st one-way clutch | 2nd one-way clutch | speed | D/C clutch | decel. brake | 3rd one-way clutch |
| 1 | L | | ◯ | | (◯) | Lock | Free | L | | ◯ | Lock |
| 2 | L | | ◯ | | (◯) | Lock | Free | H | ◯ | | Free |
| 3 | M | | ◯ | ◯ | ◯ | Free | Lock | L | | ◯ | Lock |
| 4 | M | | ◯ | ◯ | ◯ | Free | Lock | H | ◯ | | Free |
| 5 | H | ◯ | ◯ | ◯ | | Free | Free | H | ◯ | | Free |
| R | R | ◯ | | | ◯ | Free | Free | L | | ◯ | Free | pressure is increased according to the duty ratio. The duty ratio is set according to the throttle opening or the like so that the line pressure is regulated according to the throttle opening or the like.

The line 50 through which the modulator pressure is supplied to the first pressure increase port 41a is provided with a first accumulator 51 which suppress pulsation of the hydraulic pressure due to periodical on and off of the duty solenoid valve 49.

The manual valve 43 provides the forward ranges (D, 3, 2, 1), N-range, R-range and P-range. When one of the forward ranges is selected, the main line 42 is connected to a forward line 52 and when the R-range is selected, the main line 42 is connected to a reverse line 53.

The forward line 52 is led to the forward clutch 23 through an orifice 54, which throttles the flow of the working oil in different degrees depending on whether the working oil is supplied or discharged. Accordingly, in any one of the forward ranges, the forward clutch 23 is engaged. In the forward line 52 is provided a second accumulator 55 which absorbs a shock generated when the engaging pressure is applied to the forward clutch 23. A back pressure is supplied to the second accumulator 55 from the main line 42 through a line 56.

The reverse line 53 is directly led to the first hydraulic pressure chamber $34_1$ having a larger pressure receiving area of the deceleration brake 34 of the sub transmission mechanism 30, and accordingly, in the R-range, the deceleration brake 34 is engaged with a large engaging force under the line pressure introduced into the first hydraulic pressure chamber $34_1$. A line 57 branches off from the reverse line 53 and is connected to a second pressure increase port 41b of the regulator valve 41 in order to increase the regulated line pressure in the R-range.

The line pressure is supplied to first to third shift valves 61 to 63 for the main transmission mechanism 20 and to fourth to fifth shift valves 64 and 65 for the sub transmission mechanism 30 from the main line 42, the forward line 52 and the reverse line 53.

The shift valves 61 to 65 are respectively provided with a control ports 61a to 65a at their one ends. A main control pressure line 66 from the second reducing valve 45 is connected to the control ports 61a to 63a of the first to third shift valves 61 to 63 and a main control pressure line 67 from the third reducing valve 46 is connected to the control ports 64a and 65a of the fourth and fifth shift valves 64 and 65.

First to third on-off solenoid valves 71 to 73 respectively for the first to third shift valves 61 to 63 are provided in the main control pressure line 66, and fourth and fifth on-off solenoid valves 74 and 75 respectively for the fourth and fifth shift valves 64 and 65 are provided in the main control pressure line 67. When each of the on-off solenoid valves 71 to 75 is on, the control port of the corresponding shift valve is drained. Accordingly, the spool of each shift valve is positioned leftward as seen in FIG. 3 when the corresponding on-off solenoid valve is on and rightward when the corresponding on-off solenoid valve is off.

According to the combination of on and off of the solenoid valves 71 to 75, i.e., the combination of the positions of the spools of the shift valves 61 to 65, the main line 42, the forward line 52 and the reverse line 53 are selectively communicated with the brakes and/or clutches to obtain a desired gear speed. The engaging pressures applied to the clutches and brakes are regulated to adequate values in the following manner.

For the direct connection clutch 24, the coast brake 29, the low-reverse brake 26 and the 3–4 brake 28 of the main transmission mechanism 20, there are provided control valves 76 to 79 which reduce the line pressure to predetermined engaging pressures. To control ports 77a, 78a and 79a of the control valves 77, 78 and 79 for the coast brake 29, the low-reverse brake 26 and the 3–4 brake 28, a control pressure regulated by a first linear solenoid valve 80 is applied through a line 81 and the engaging pressures to the coast brake 29, the low-reverse brake 26 and the 3–4 brake 28 are controlled according to the control pressure.

To a control port 76a of the control valve 76 for the direct connection clutch 24, the engaging pressure to the direct connection clutch 24 itself is applied through a line 85 provided with an one-way orifice 83 and a third accumulator 84, and rising of the engaging pressure to the direct connection clutch 24 is controlled by operation of the accumulator 84.

The first linear solenoid valve 80 regulates the main control pressure supplied from the first reducing valve 44 through the line 47 under the control of a control signal from a controller 160 (FIG. 4), and produces a control pressure suitable for a given gear speed and/or a given running condition. A pressure regulation inhibiting line 86 is connected to ports 76b and 78b respectively provided at one ends of the control valves 76 and 78, and the line pressure is supplied to the ports 76b and 78b in the R-range to hold stationary the spools of the control valves 76 and 78 at their leftward positions, whereby the control valves 76 and 78 for the direct connection clutch 24 and the low-reverse brake 26 are inhibited from regulating the line pressure. The engaging pressure to the coast brake 29 is applied to a port 79b of the control valve 79 for the 3–4 brake 28 through a line 87 when the engaging pressure is supplied to the coast brake 29, thereby controlling the pressure regulation by the control valve 79.

The control pressure produced by the first solenoid valve 80 is supplied to a control port 88a of an accumulator control valve 88. The accumulator control valve 88 regulates the line pressure supplied from the main line 42 through a line 89 according to the control pressure from the first linear solenoid valve 80, thereby producing the back pressure for the third accumulator 84 and a fourth accumulator 90, and supplies it to back pressure ports 84a and 90a of the accumulators 84 and 90.

In order to control the engaging pressures in the sub transmission mechanism 30, there are provided a direct connection clutch control valve 101 which regulates the engaging pressures supplied to the first and second hydraulic pressure chambers $32_1$ and $32_2$ of the direct connection clutch 32, a deceleration brake control valve 102 which regulates the second hydraulic pressure chamber $34_2$, having a smaller pressure receiving area, of the deceleration brake 34, and a second linear solenoid valve 103. As described above, to the first hydraulic pressure chamber $34_1$, having a larger pressure receiving area, of the deceleration brake 34, the line pressure is directly supplied through the reverse line 53 from the manual valve 43 in the R-range.

The line pressure is supplied to the second linear solenoid valve 103 from the main line 42 as the main control pressure, and the second linear solenoid valve 103 regulates the main control pressure according to the control signal from the controller 160. The second linear solenoid valve 103 supplies the regulated control pressure to the control port 102a of the deceleration brake control valve 102 through a line 104 and the fifth shift valve 65 and then through a line 105 or supplies the same to the first hydraulic pressure chamber $32_1$ of the direct connection clutch 32 through the line 104 and the fifth shift valve 65 and then through a line 106. When the control pressure is supplied to the control port 102a of the deceleration brake control valve 102 from the second linear solenoid valve 103, the control valve 102 regulates the line pressure, supplied from the main line 42 through a line 107, the fourth shift valve 64, a line 108, the fifth shift valve 65 and a line 109, according to the control pressure and supplies it to the second hydraulic pressure chamber $34_2$ of the deceleration brake 34 through a line 110.

To the direct connection clutch control valve 101, the line pressure is supplied from the main line 42 through the line 107, the fourth shift valve 64 and a line 111. The direct connection clutch control valve 101 regulates the line pressure, and the regulated line pressure is selectively supplied to the first hydraulic pressure chamber $32_1$ of the direct connection clutch 32 or to the second hydraulic pressure chamber $32_2$ through a one-way orifice 112, a line 113 and the fifth shift valve 65 and then through the line 106 or through the one-way orifice 112, the line 113 and the fifth shift valve 65 and then through a line 114.

To the control port 101a of the direct connection clutch control valve 101, the engaging pressure supplied to the first hydraulic pressure chamber $32_1$ or the second hydraulic pressure chamber $32_2$ of the direct connection clutch 32 is supplied as it is through a line 117 provided with a one-way orifice 115 and a fifth accumulator 116. Accordingly the engaging pressure rises via a certain plateau state by virtue of the fifth accumulator 116. A back pressure is supplied to a back pressure port 116a of the fifth accumulator 116 from the main line 42 through a line 118.

The first to fifth solenoid valves 71 to 75 are selectively turned on and off in the combinations shown in the following table 2 to provide first to fifth forward speeds and a reverse. In table 2, (1) and (2) respectively show first and second in the engine brake range.

shift valve 63. Another line 124 also branching off from the forward line 52 is closed by the second shift valve 62 and a line 125 branching off from the main line 42 is closed by the first shift valve 61. Thus in this state, only the forward clutch 23, which is normally engaged in the forward ranges, is engaged, and the main transmission mechanism 20 provides the low gear speed without engine brake effect.

On the sub transmission mechanism side, both the fourth and fifth on-off solenoid valves are off, and the spools of the fourth and fifth shift valves 64 and 65 are in the right position. In this state, the main line 42 communicates with the line 108 through the line 107 and the fourth shift valve 64 and then with the line 109, which is led to the deceleration brake control valve 102, through the fifth shift valve 65, whereby the line pressure is supplied to the control valve 102. At this time, since the control pressure produced by the second linear solenoid valve 103 is supplied to the control port 102a of the deceleration brake control valve 102 through the line 104, the fifth shift valve 65 and the line 105, the line pressure is regulated to a predetermined engaging pressure according to the control pressure and is supplied to the second hydraulic pressure chamber $34_2$ of the deceleration brake 34, whereby the deceleration brake 34 is engaged.

The direct connection clutch 32 is in the state where the first hydraulic pressure chamber $32_1$ communicates with the drain port of the fourth shift valve 64 through the line 106, the fifth shift valve 65, the line 113, direct connection clutch control valve 101 and the line 111, and the second hydraulic pressure chamber $32_2$ communicates with the drain port of the fifth shift valve 65 through the line 114. As a result, the sub transmission mechanism 30 provides the low gear speed where the engine brake effect can be obtained, and the whole automatic transmission 1 provides first without engine brake effect.

In first where the engine brake effect can be obtained (employed in 1-range, 2-range or the like), the combination of on and off of the solenoid valves 71 to 75 differs from that for first without engine brake effect in that the third on-off solenoid valve 73 is on and the spool of the

TABLE 2

| on-off S/V | P | R | N | 1 | (1) | 2 | (2) | 3 | 4 | 5 |
|---|---|---|---|---|---|---|---|---|---|---|
| 1st | OFF | OFF | OFF | ON | ON | ON | ON | OFF | OFF | OFF |
| 2nd | OFF | OFF | OFF | OFF | OFF | OFF | OFF | ON | ON | ON |
| 3rd | OFF | OFF | OFF | OFF | ON | OFF | ON | ON | ON | OFF |
| 4th | OFF | OFF | OFF | OFF | OFF | ON | ON | OFF | ON | ON |
| 5th | OFF | OFF | OFF | OFF | OFF | OFF | OFF | OFF | ON | ON |

The relation between the combinations of on and off of the solenoid valves 71 to 75 and the gear speeds will be described in detail with reference to table 2, hereinabove.

In first where the engine brake effect is not obtained (employed in D-range or the like), on the main transmission mechanism side, the first on-off solenoid valve 71 is on and the second and third on-off solenoid valves 72 and 73 are off, and the spool of the first shift valve 61 is in the left position and the spools of the second and third shift valves 62 and 63 are in the right position. In this state, a line 121 branching off from the forward line 52 communicates with a line 122 through the first shift valve 61 and then with a line 123 through the second shift valve 62, though the line 123 is closed by the third third shift valve 63 is in the left position. In this state, the forward line 52 communicates with the low-reverse brake control valve 78 through the line 121, the first shift valve 61, the line 122, the second shift valve 62, the line 123, the third shift valve 63 and the line 126, and the line pressure is supplied to the control valve 78.

The line pressure supplied to the control valve 78 is regulated to an engaging pressure according to the control pressure which is supplied to the control port 78a from the first linear solenoid valve 80 through the line 81 and then supplied to the low-reverse brake 29 through the line 127. Thus the low-reverse brake 29 is engaged in addition to the forward clutch 23, and thus first where the engine brake effect can be obtained is provided in the main transmission mechanism 20. Since in this state, the sub transmission mechanism 30 provides the low gear speed where the engine brake effect can be obtained, the whole automatic transmission 1 provides first with engine brake effect.

In second without engine brake effect (employed in D-range), the combination of on and off of the solenoid valves 71 to 75 differs from that for first without engine brake effect in that the fourth on-off solenoid valve 74 is on and the spool of the fourth shift valve 64 is in the left position. Similarly in second with engine brake effect (employed in 1-range, 2-range or the like), the combination of on and off of the solenoid valves 71 to 75 differs from that for first with engine brake effect in that the fourth on-off solenoid valve 74 is on and the spool of the fourth shift valve 64 is in the left position.

In this state, the line pressure supplied to the fourth shift valve 64 from the main line 42 through the line 107 is supplied to the direct connection clutch control valve 101 from the fourth shift valve 64 through the line 111 and then to the first hydraulic pressure chamber $32_1$ of the direct connection clutch 32 through the line 113, the fifth shift valve 65 and the line 106 after regulated in the rising manner by the control valve 101. Thus the sub transmission mechanism 30 is shifted to the high gear speed, whereby the whole automatic transmission 1 is shifted to second without engine brake effect or second with engine brake effect.

In third, on the main transmission mechanism side, the first to third on-off solenoid valves 71 to 73 are respectively off, on and on, and the spools of the first to third shift valves 61 to 63 are respectively in the right, left and left positions. In this state, the line 121 branching off from the forward line 52 communicates with the line 128 through the first shift valve 61 and then with the coast brake control valve 77 through the third shift valve 63 and the line 129. Accordingly, the line pressure is supplied to the control valve 77, regulated to a predetermined engaging pressure according to the control pressure supplied from the first linear solenoid valve 80 through the line 81, and then supplied to the coast brake 29, whereby the coast brake 29 is engaged.

The line 124 branching off from the forward line 52 communicates with the 3–4 brake control valve 79 through the second shift valve 62 and the line 131, and the line pressure is supplied to the control valve 79. To the control valve 79, the control pressure is supplied from the first linear solenoid valve 80 through the line 81 and at the same time, the engaging pressure supplied to the coast brake 29 is supplied through the line 87 as a control pressure. The engaging pressure regulated according to these control pressures is supplied to the 3–4 brake 28 through the line 132.

As a result, in the main transmission mechanism 20, the 3–4 brake 28 is engaged as well as the coast brake 29 in addition to the forward clutch 23 and accordingly the middle gear speed with the engine brake effect is obtained.

In the sub transmission mechanism 30, both the fourth and fifth on-off solenoid valves 74 and 75 are off, and the sub transmission mechanism 30 is in the low gear speed. Thus the whole automatic transmission 1 provides third with engine brake effect which has a predetermined reduction ratio.

In fourth, the state of the on-off solenoid valves differs from that of third in that both the fourth and fifth on-off solenoid valves 74 and 75 are turned on, and the spools of the fourth and fifth shift valves 64 and 65 are in the left position. In this state, as in second, the line pressure is supplied to the direct connection clutch control valve 101 from the main line 42 through the line 107, the fourth shift valve 64 and the line 111, regulated in the rising, regulated to a predetermined engaging pressure and then supplied to the second hydraulic pressure chamber $32_2$ of the direct connection clutch 32 through the line 114. As a result, the direct connection clutch 32 is engaged and the sub transmission mechanism 30 is shifted to the high gear speed. In this case, since the main transmission mechanism 20 is in the middle gear speed, the whole automatic transmission 1 is in fourth.

In fifth, the first to third on-off solenoid valves 71 to 73 in the main transmission mechanism 20 are respectively off, on and off, and the spools of the first to third shift valves 61 to 63 are respectively in the right, left and right position. In this state, the line 125 branching off from the main line 42 communicates with the line 133 through the first shift valve 61 and then with the direct connection clutch control valve 76 through the third shift valve 63 and the line 134, whereby the line pressure is supplied to the control valve 76. The engaging pressure regulated by the control valve 76 is supplied to the direct connection clutch 24 through the line 82 to engage the direct connection clutch 24. Thus the forward clutch 23 and the direct connection clutch 24 are engaged in the main transmission mechanism 20, and the main transmission mechanism 20 is shifted to the high gear speed. When the direct connection clutch 24 is engaged, the engaging pressure rises via a predetermined plateau state by virtue of the third accumulator 84.

As in fourth, both the fourth and fifth on-off solenoid valves 74 and 75 are on, and the sub transmission mechanism 30 is in the high gear speed. Accordingly the whole automatic transmission 1 is in fifth.

In reverse (the manual valve 43 is in R-range), the reverse line 53 communicates with the main line 42 through the manual valve 43 and the first to third on-off solenoid valves 71 to 73 are all off, whereby the first to third shift valves 61 to 63 are all in the right position.

In this state, as in fifth, the line 125 branching off from the main line 42 communicates with the line 133 through the first shift valve 61 and then with the direct connection clutch control valve 76 through the third shift valve 63 and the line 134, whereby the line pressure is supplied to the control valve 76. In this case, since the line pressure is supplied to the port 76b of the control valve 76 from the reverse line 53 through the line 86, the spool of the control valve 76 is held in the left position and the line pressure supplied through the line 134 is supplied to the direct connection clutch 24 without being reduced, whereby the direct connection clutch 24 is engaged with a high engaging pressure.

The reverse line communicates with the low-reverse brake control valve 78 through a line 136 provided with an orifice 135, which throttles the flow of the working oil in different degrees depending on whether the working oil is supplied or discharged, the third shift valve 63 and the line 126, and the line pressure is supplied to the control valve 78 as in first with engine brake effect. In this case, since the line pressure is supplied to the port 78b of the control valve 78 from the reverse line 53 through the line 86, the spool of the control valve 78 is held in the left position and the line pressure supplied through the line 126 is supplied to the low-reverse brake 26 without being regulated by the control valve 78, whereby the low-reverse brake 26 is engaged with a high engaging pressure.

Thus in the main transmission mechanism 20, the direct connection clutch 24 and the low-reverse brake 26 are engaged and reverse is obtained. In the sub transmission mechanism 30, both the fourth and fifth on-off solenoid valves 74 and 75 are off and the sub transmission mechanism 30 is in the low gear speed with engine brake effect. Accordingly the whole automatic transmission 1 is in reverse having a large reduction ratio.

When the engaging pressure is supplied to the low-reverse brake 26, the working oil is introduced into the fourth accumulator 90 from the line 136 through the line 137 and accordingly the engaging pressure gradually rises via a predetermined plateau state.

The hydraulic circuit 40 is further provided with first and second lockup shift valves 141 and 142 and a lockup control valve 143 in order to control the lockup clutch 17 in the torque convertor 10.

A convertor line 144 is led from the main line 42 to the first shift valve 141 and the control valve 143, and a control line 66 from the second reducing valve 45 is connected to a control port 141a of the first shift valve 141 through a line 145. An on-off solenoid valve 146 for controlling lockup is provided in the line 145. When the on-off solenoid valve 146 is off, the control pressure is applied to the control port 141a of the first shift valve 141 and the spool of the valve 141 is positioned leftward. In this state, the convertor line 144 communicates with a release line 147 which communicates with a lockup release chamber 17a in the torque convertor 10, and the lockup clutch 17 is disengaged.

When the on-off solenoid valve 146 is turned on, the control pressure to the control port 141a of the first shift valve 141 is drained and the spool is moved rightward. In this state, the convertor line 144 communicates with a lockup line 148 which communicates with a lockup chamber 17b in the torque convertor 10, and the lockup clutch 17 is engaged. At this time, the lockup release line 147 communicates with the lockup control valve 142 through the first shift valve 141 and a line 149, and the working pressure regulated by the control valve 143 is supplied to the lockup release chamber 17b of the lockup clutch 17 as the lockup release pressure.

A control line 150 led from the first reducing valve 44 is connected to a control port 143a on one end of the control valve 143, and a duty solenoid valve 151 is provided in the control line 150. The control pressure supplied to the control port 143a is regulated according to the duty ratio of the control signal applied to the duty solenoid valve 151, thereby regulating the lockup release pressure.

The control pressure produced by the duty solenoid valve 151 is also supplied to a control port 142a of the second shift valve 142 through a line 152. When the control pressure is not higher than a predetermined value, the spool of the second shift valve 142 is positioned rightward, and a line 153 led from the main line 42 through the line 56 communicates with a regulation inhibiting port 143b of the control valve 143 through a line 154 and supplies the line pressure to the port 143b, whereby the control valve 143 is inhibited from regulating the lockup release pressure and the lockup clutch 17 is completely engaged only supplied with the engaging pressure.

When the control pressure exceeds the predetermined value, the control valve 143 regulates the lockup release pressure and the lockup clutch 17 is caused to slip according to the lockup release pressure.

The spool of the second shift valve 142 is in the right position when the control pressure is not supplied to the shift valve 142. In this state, a line 155 which bypasses the orifice 54 in the line 52 communicating with the forward clutch 23 is opened.

Figure 4:
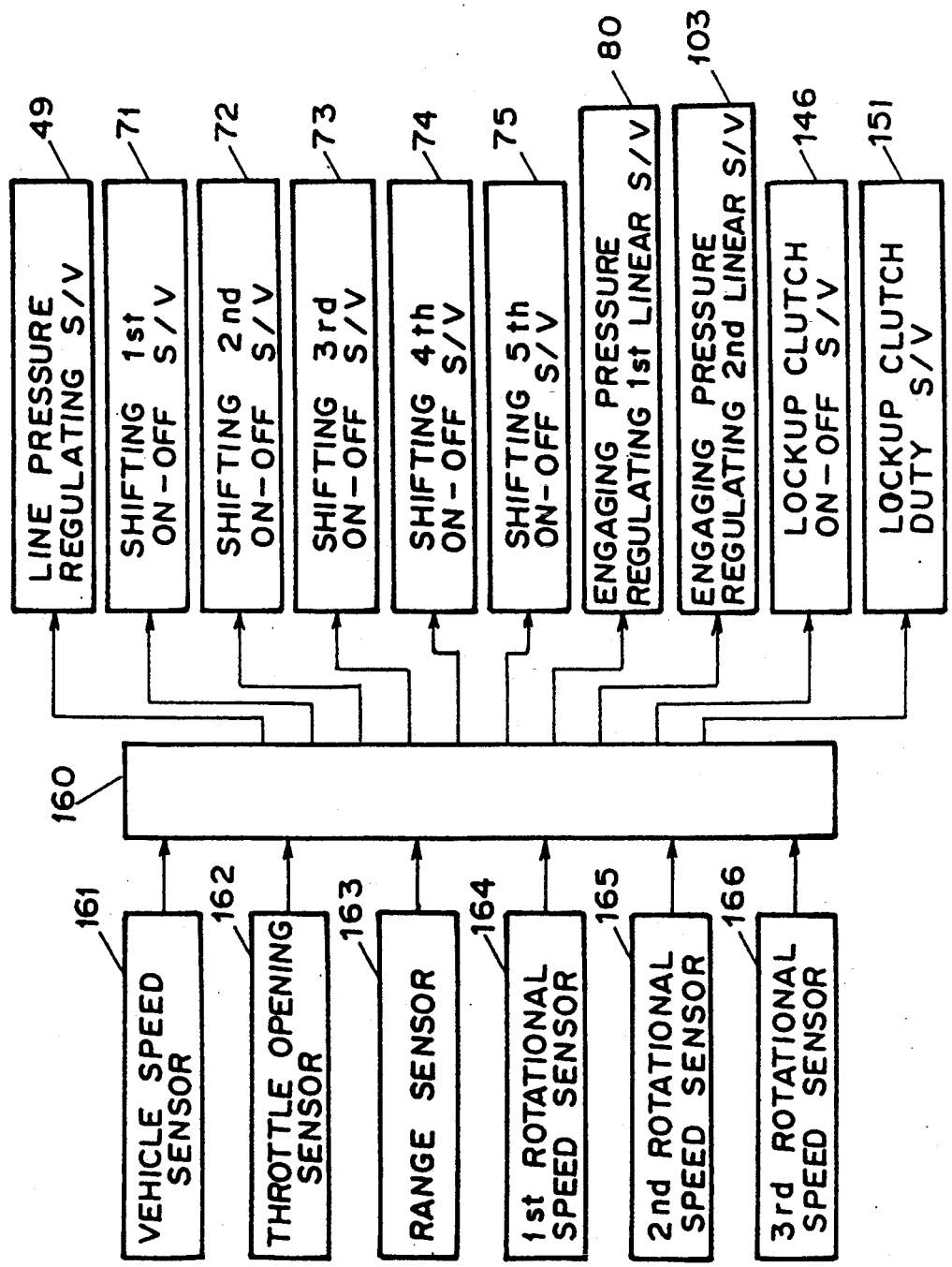
FIG. 4 shows the control system for the solenoid valves in the hydraulic circuit shown in FIG. 3.

The duty solenoid valve 49 for regulating the line pressure, the first to fifth on-off solenoid valves 71 to 75, the first and second linear solenoid valves 80 and 103 for regulating the engaging pressure, the on-off solenoid valve 146 for lockup control and the duty solenoid valve 151 are controlled by control signals from the controller 160 as shown in FIG. 4. Signals from a vehicle speed sensor 161 which detects the vehicle speed, a throttle opening sensor 162 which detects the opening of the throttle valve of the engine, a range sensor 163 which detects the range selected by the manual valve and the like are input into the controller 160, and the controller 160 controls the solenoid valves according to the running condition and/or the driver's demand represented by the signals.

Further a first rotational speed sensor 164 which detects the rotational speed of the input side of the main transmission mechanism 20, a second rotational speed sensor 165 which detects the rotational speed of the output side of the main transmission mechanism 20 (the input side of the sub transmission mechanism 30), and a third rotational speed sensor 166 which detects the rotational speed of the output side of the sub transmission mechanism 30 are connected to the controller 160. The controller 160 calculates the gear ratios of the main transmission mechanism 20 and the sub transmission mechanism 30 on the basis of the sensors 164 to 166 and controls supply of the engaging pressure to the friction coupling elements according to the values of the gear ratios as will be described later.

In the automatic transmission 1 of this embodiment having the structure described above, the engaging pressure is supplied to the first hydraulic pressure chamber $32_1$ of the direct connection clutch 32 of the sub transmission mechanism 30 to engage the direct connection clutch 32 upon 1-2 upshift, and the first hydraulic pressure chamber $32_1$ is drained to disengage the direct connection clutch 32 upon 2-3 upshift as can be understood from the description above. The hydraulic circuit 40 is arranged so that both the engagement and disengagement of the direct connection clutch 32 are smoothly effected. This will be described in detail with reference to FIGS. 5 to 7, hereinbelow.

As described above, in first, both the fourth and fifth on-off solenoid valves 74 and 75 of the sub transmission mechanism 30 are off, and the spools of the fourth and fifth shift valves 64 and 65 are both in the right position. Accordingly, the line pressure is supplied from the main line 42 to the deceleration brake control valve 102 through the line 107, the fourth shift valve 64, the line 108, the fifth shift valve 65 and the line 109, and then supplied to the second hydraulic pressure chamber $34_2$ of the deceleration brake 34 through the line 110 after regulated by the control valve 102 according to the control pressure from the second linear solenoid valve 103, whereby the deceleration brake 34 is in the engaged state and the sub transmission mechanism 30 is in the low gear speed.

At this time, the first hydraulic pressure chamber $32_1$ of the direct connection clutch 32 is in communication with the drain port 64b of the fourth shift valve 64 through the line 106, the fifth shift valve 65, the line 113, the direct connection clutch control valve 101 and the line 111, and the second hydraulic pressure chamber $32_2$ is in communication with the drain port 65b of the fifth shift valve 65 through the line 114.

When the fourth on-off solenoid valve 74 is turned on in this state to shift the automatic transmission 1 to second, the spool of the fourth shift valve 64 is moved to the left position with the spool of the fifth shift valve 65 in the right position.

Figure 5:
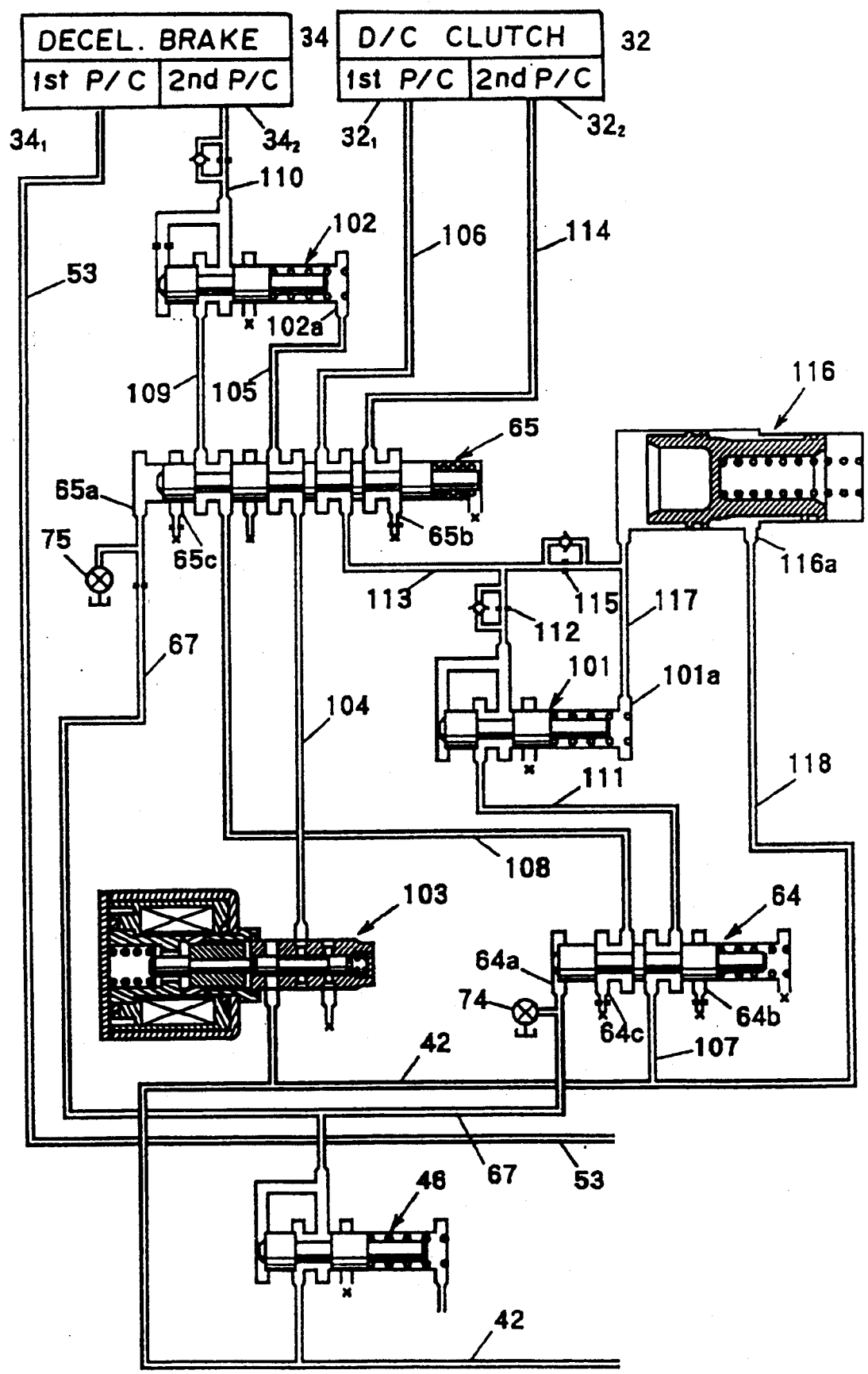
FIG. 5 is a view showing state during 1-2 upshift of the part of the hydraulic circuit controlling the sub transmission mechanism.

This state is shown in FIG. 5. In this case, the line pressure supplied to the fourth shift valve 64 from the main line 42 through the line 107 is supplied to the direct connection clutch control valve 101 from the fourth shift valve 64 through the line 111 and then further supplied from the control valve 101 to the first hydraulic pressure chamber $32_1$ of the direct connection clutch 32 to engage it through the one-way orifice 112, the line 113, the fifth shift valve 65 and the line 106. Further, at this time, the second hydraulic pressure chamber $34_2$ of the deceleration brake 34 is in communication with the drain port 64c of the fourth shift valve 64 through the line 110, the deceleration control valve 102, the line 109, the fifth shift valve 65 and the line 108.

Thus the sub transmission mechanism 30 is shifted to the high gear speed and 1-2 upshift is completed. Rising of the engaging pressure supplied to the first hydraulic pressure chamber $32_1$ of the direct connection clutch 32 during 1-2 upshift is controlled in the following manner.

That is, the line pressure supplied to the direct connection clutch control valve 101 from the fourth shift valve 64 is regulated according to the control pressure in the control port 10a of the control valve 101. To the control port 101a, the working oil output from the control valve 101 itself is supplied as the control pressure through the line 117, the one-way orifices 112 and 115 with the accumulator 116 actuated. Accordingly, the control pressure and the engaging pressure regulated according to the control pressure gradually rise via a plateau state. Especially since the regulation of the engaging pressure is effected by the accumulator 116, the engaging pressure can be optimally and constantly regulated for any desired flow rate of the working oil without variation or fluctuation in the hydraulic pressure, whereby the automatic transmission 1 is smoothly shifted from first to second.

When the automatic transmission 1 is shifted from second to third, the 3-4 brake 28 is engaged to shift the main transmission mechanism 20 from the low gear speed to the middle gear speed while the direct connection clutch 32 is disengaged and the deceleration brake 34 is engaged to shift the sub transmission mechanism 30 from the high gear speed to the low gear speed. That is, in 2-3 shift, the shifting actions of the main transmission mechanism 20 and the sub transmission mechanism 30 are simultaneous and reverse to each other, that is, in the main transmission mechanism 20, the gear ratio increases while in the sub transmission mechanism 30, the gear ratio reduces. In such a case, the shifting action must be progressed while keeping an adequate relation between the actions in the main and sub transmission mechanisms, more particularly, while conforming reduction in the gear ratio in the main transmission mechanism 20 to increase in the gear ratio in the sub transmission mechanism 30. For this purpose, the following control is effected in 2-3 upshift in this hydraulic circuit 40.

Though the combinations of on and off of the fourth and fifth on-off solenoid valves 74 and 75 in second and third are as shown in the aforesaid table 2, the combination in second is changed to that in third via first and second intermediate patterns shown in the following table 3.

TABLE 3

|  | second | 1st int. | 2nd int. | third |
| --- | --- | --- | --- | --- |
| 4th S/V | ON | ON | OFF | OFF |
| 5th S/V | OFF | ON | ON | OFF |

Figure 6:
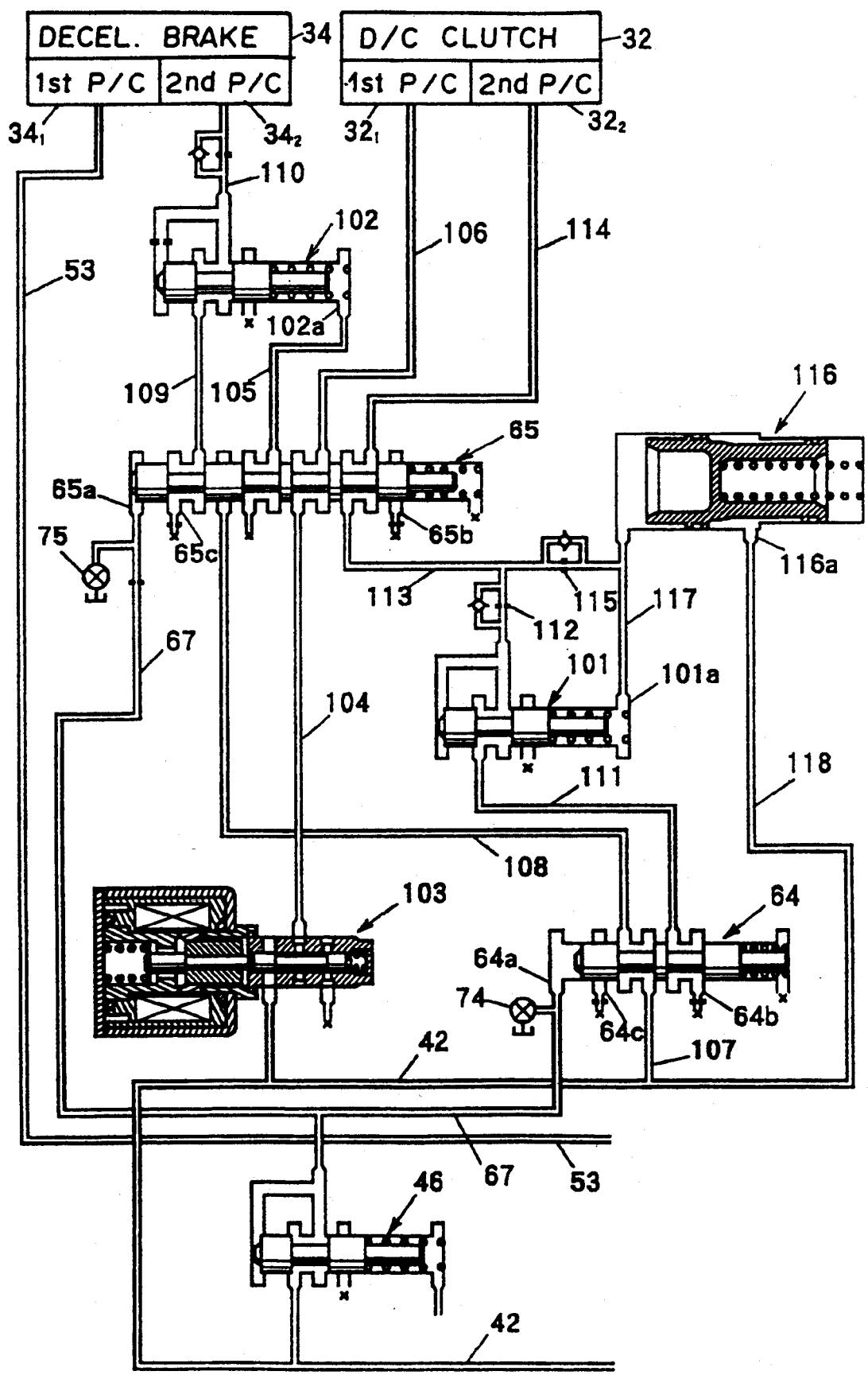
FIG. 6 is a view showing state during 2-3 upshift of the part of the hydraulic circuit controlling the sub transmission mechanism.
Figure 7:
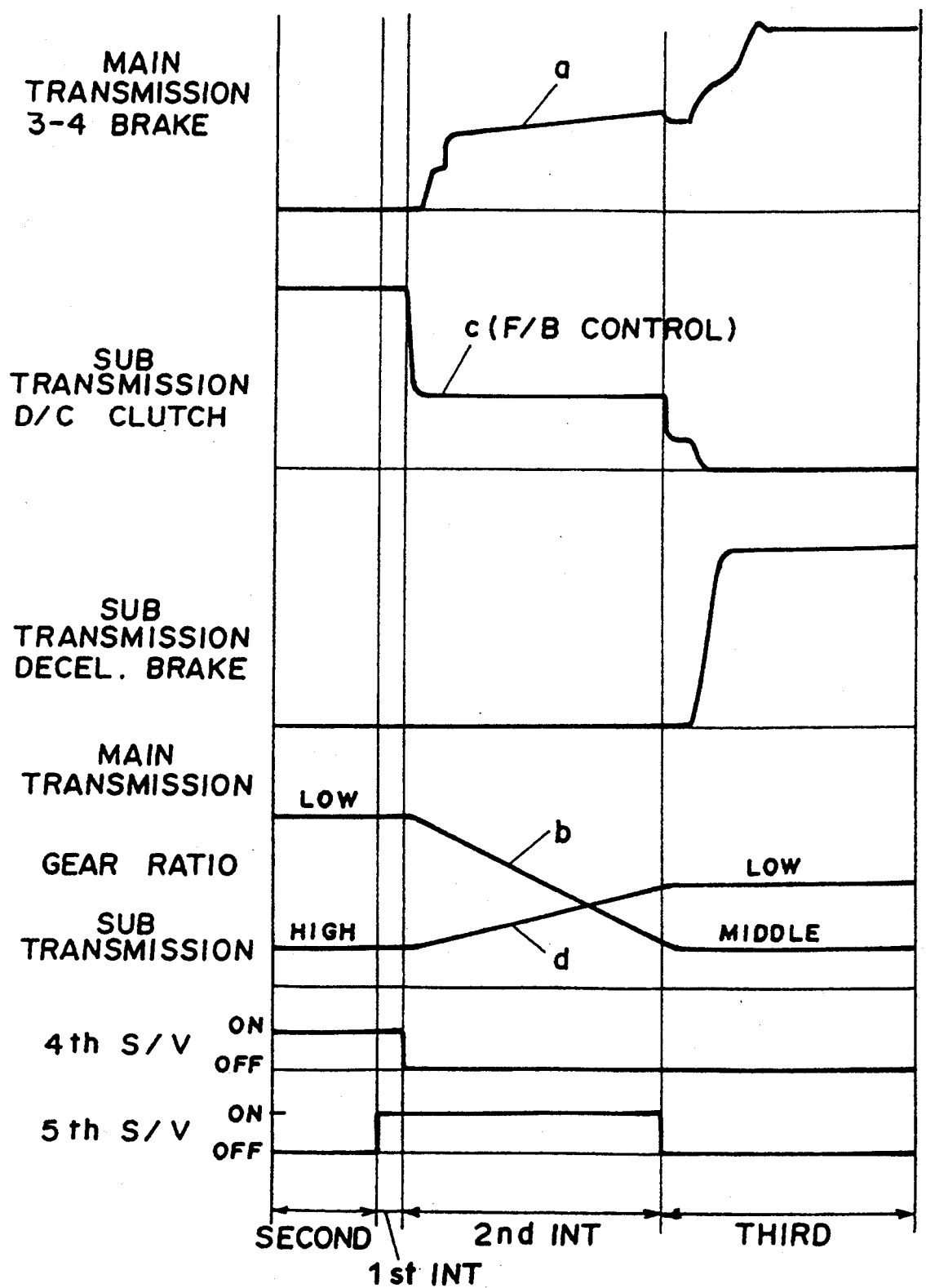
FIG. 7 is a time chart showing the changes in the various parts of the automatic transmission during 2-3 upshift.

In accordance with table 3, when shifting to third from second, the fifth on-off solenoid valve 75 is first turned on with the fourth on-off solenoid valve 74 remaining on (both the fourth and fifth on-off solenoid valve on: first intermediate pattern) and the spool of the fifth shift valve 65 is moved leftward from the state shown in FIG. 5. In this state, the first hydraulic pressure chamber $32_1$ of the direct connection clutch 32 comes to communicate with the second linear solenoid valve 103 through the line 106, the fifth shift valve 65 and the line 104. Thereafter, the fourth on-off solenoid valve 64 is turned off with the fifth on-off solenoid valve 65 remaining on (second intermediate pattern), the spools of the fourth and fifth shift valves 64 and 65 being respectively in the right position and the left position as shown in FIG. 6.

In this state, the second hydraulic pressure chamber $34_2$ of the deceleration brake 34, which is supplied with the engaging pressure in third, is kept in communication with the second drain port 65c of the fifth shift valve 65 through the line 110, the control valve 102 and the line 109, whereby the deceleration brake 34 is kept disengaged. At the same time, the first hydraulic pressure chamber $32_1$ of the direct connection clutch 32 is in communication with the second linear solenoid valve 103 as described above, and the first hydraulic pressure chamber $32_1$ of the direct connection clutch 32 is drained to disengage the direct connection clutch 32 by the second linear solenoid valve 103 in this state.

In the main transmission mechanism 20, 3-4 brake engaging action is initiated. As the engaging pressure supplied to the 3-4 brake 28 increases as shown by line a in FIG. 7, the gear ratio of the main transmission mechanism 20 reduces from the low gear speed to the middle gear speed as shown by line b in FIG. 7. At this time, the controller 160 causes the second linear solenoid valve 103 to control the direct connection clutch 32 disengaging action so that the gear ratio in the sub transmission mechanism 30 increases conforming to reduction in the gear ratio in the main transmission mechanism 20.

That is, the controller 160 calculates the gear ratio in the main transmission mechanism 20 on the basis of the signals from the first and second rotational speed sensors 164 and 165, and sets a target gear ratio in the sub transmission mechanism 30 at each time so that the gear ratio in the sub transmission mechanism 30 increases in step with reduction in the gear ratio in the main transmission mechanism 20. Then the controller 160 compares each of the target gear ratio with the actual gear ratio calculated on the basis of the signals from the second and third rotational speed sensors 165 and 166, and feedback-controls the direct connection clutch disengaging action of the second linear solenoid valve 103 so that the difference therebetween converges on 0 as shown by line c in FIG. 7.

In this manner, the gear ratio of the sub transmission mechanism 30 increases from the high gear speed to the low gear speed (downshift) in step with reduction in the gear ratio in the main transmission mechanism 20 (downshift), whereby 2-3 upshift can be smoothly effected.

Though the deceleration brake 34 of the sub transmission mechanism 30 is kept disengaged until this point, the automatic transmission 1 can shift to third since the third one-way clutch 33 (FIG. 1) which is provided in parallel to the deceleration brake 34 locks. Thereafter, the combination of the on and off of the fourth and fifth on-off solenoid valves 74 and 75 changes from the second intermediate pattern to the pattern for third and the spools of the fourth and fifth shift valves 64 and 65 are both positioned in the right position, whereby the engaging pressure is supplied to the second hydraulic pressure chamber $34_2$ of the deceleration brake 34.

Thus, the engaging pressure is supplied to the first hydraulic pressure chamber $32_1$ of the direct connection clutch 32 of the sub transmission mechanism 30 in an optimal manner by the direct connection clutch control valve 101 and the accumulator 116 when the direct connection clutch 32 is to be engaged during 1-2 upshift, and is discharged from the first hydraulic pressure chamber $32_1$ in an optimal manner by the second linear solenoid valve 103 and the controller 160 which controls the second linear solenoid valve 103 when the direct connection clutch 32 is to be engaged during 1-2 upshift.

When one of the fourth and fifth on-off solenoid valves 74 and 75 and the second linear solenoid valve 103 becomes out of order, the controller 160 controls the friction coupling elements in the following manner.

The following table 4 shows the relation between the combination of on and off of the fourth and fifth on-off solenoid valves 74 and 75 and engaging pressure supply to the second hydraulic pressure chamber $34_2$ of the deceleration brake 34, and to the first hydraulic pressure chamber $32_1$ and the second hydraulic pressure chamber $32_2$ of the direct connection clutch 32. In table 4 and 5 to 9, ○ indicates that the engaging pressure is supplied to the corresponding element and "linear" indicates that the engaging pressure is supplied to the element after regulated by the second linear solenoid valve 103.

TABLE 4

| 4th S/V | 5th S/V | 2nd Chamber $34_2$ | 1st Chamber $32_1$ | 2nd Chamber $32_2$ |
|---|---|---|---|---|
| ON | ON | | linear | ○ |
| ON | OFF | | ○ | |
| OFF | ON | | linear | |
| OFF | OFF | ○ | | |

Table 5 shows the relation between the forward speeds (first to fifth) provided by the whole automatic transmission 1 and the combination of on and off of the fourth and fifth on-off solenoid valves 74 and 75, engaging pressure supply to the second hydraulic pressure chamber $34_2$ of the deceleration brake 34, and to the first hydraulic pressure chamber $32_1$ and the second hydraulic pressure chamber $32_2$ of the direct connection clutch 32, whether the engine brake effect (E/B) can be obtained and the gear speed in the sub transmission mechanism 30 when the fourth and fifth on-off solenoid valves 74 and 75 and the second linear solenoid valve 103 are all normal. In table 5, "avail" indicates that the engine brake effect can be obtained.

TABLE 5

| | 4th S/V | 5th S/V | 2nd Chamber $34_2$ | 1st Chamber $32_1$ | 2nd Chamber $32_2$ | E/B | Sub T/M |
|---|---|---|---|---|---|---|---|
| 1 | OFF | OFF | ○ | | | avail | Low |
| 2 | ON | OFF | | ○ | | avail | High |
| 3 | OFF | OFF | ○ | | | avail | Low |
| 4 | ON | ON | | linear | ○ | avail | High |
| 5 | ON | ON | | linear | ○ | avail | High |

As shown in table 5, in second, the engaging pressure is supplied to the first hydraulic pressure chamber $32_1$ of the direct connection clutch 32 through the line 113 and the fourth shift valve 64 as shown in FIG. 5, and in fourth and fifth, the engaging pressure is regulated by the second linear solenoid valve 103 and then supplied to the first hydraulic pressure chamber $32_1$ of the direct connection clutch 32 through the line 104 and the fifth shift valve 65 as shown in FIG. 6 in order to precisely control the engaging pressure to the first hydraulic pressure chamber $32_1$ during downshift from fourth or fifth.

That is, in view of the fact that the first hydraulic pressure chamber $32_1$ of the direct connection clutch 32 is connected to both the lines 104 and 113 through the fifth shift valve 65, the controller 160 controls the friction coupling elements in the following manner in order to shift the automatic transmission 1 to a desired gear speed in case where one of the fourth and fifth on-off solenoid valves 74 and 75 and the second linear solenoid valve 103 becomes out of order.

1) When the fourth on-off solenoid valve 74 becomes out of order and cannot be turned on.

When the fourth on-off solenoid valve 74 cannot be turned on due to break of the energizing wire or the like, the controller 160 controls the fifth on-off solenoid valve 75 in the pattern shown in the following table 6. That the fourth on-off solenoid valve 74 is out of order is detected by monitoring the current or voltage of the energizing wire for the on-off solenoid valve, and the gear speed is designated by the signal from the range sensor 163. In table 6, "linear (max)" indicates that the driving current for the second linear solenoid valve 103 is minimized and the pressure in the line 104 is maximized.

TABLE 6

| | 4th S/V | 5th S/V | 2nd Chamber $34_2$ | 1st Chamber $32_1$ | 2nd Chamber $32_2$ | E/B | Sub T/M |
|---|---|---|---|---|---|---|---|
| 1 | OFF | OFF | ○ | | | avail | Low |
| 2 | OFF | ON | | linear (max) | | avail | High |
| 3 | OFF | OFF | ○ | | | avail | Low |
| 4 | OFF | ON | | linear (max) | ○ | avail | High |
| 5 | OFF | ON | | linear (max) | ○ | avail | High |

In second, since the fourth on-off solenoid valve 74 is off, the line pressure regulated by the direct connection clutch control valve 101 cannot be supplied to the line 113 as can be understood from FIG. 6. However, by turning on the fifth on-off solenoid valve 75 to move the fifth shift valve 65 to the position shown in FIG. 6 so that the pressure can be supplied to the first hydraulic pressure chamber $32_1$ of the direct connection clutch 32 through the line 104 and controlling the second linear solenoid valve 103 so that the pressure in the line 104 is maximized, a pressure equivalent to the pressure supplied to the first hydraulic pressure chamber $32_1$ when the fourth on-off solenoid valve 74 is normal can be supplied thereto, whereby the automatic transmission 1 can be shifted to second which is the same as that obtained when the fourth on-off solenoid valve 74 is normal. In fourth and fifth, though the fourth and fifth on-off solenoid valves 74 and 75 are turned on and off in the same pattern as when the fourth on-off solenoid valve 74 is normal, the second linear solenoid valve 103 is controlled to maximize the pressure in the line 104 in view of the fact that the pressure cannot be supplied to the second hydraulic pressure chamber $32_2$ of the direct connection clutch 32, whereby the automatic transmission 1 can be shifted to fourth and fifth which are equivalent to those obtained when the fourth on-off solenoid valve 74 is normal.

2) When the fourth on-off solenoid valve 74 becomes out of order and cannot be turned off.

Figure 8:
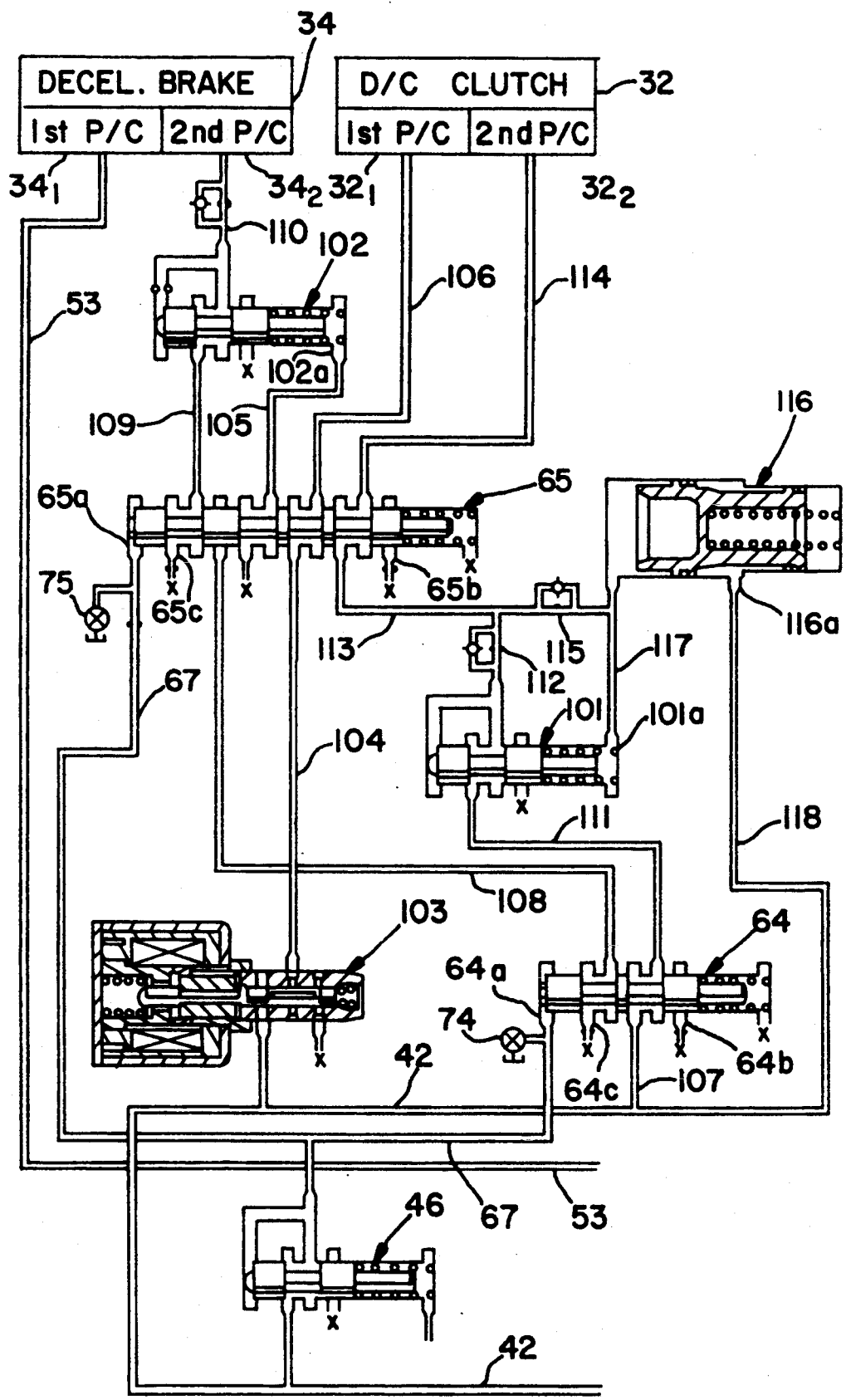
FIGS. 8 and 9 are views similar to FIG. 5 but for illustrating the control of the solenoid valves when one of the solenoid valves becomes out of order.
Figure 9:
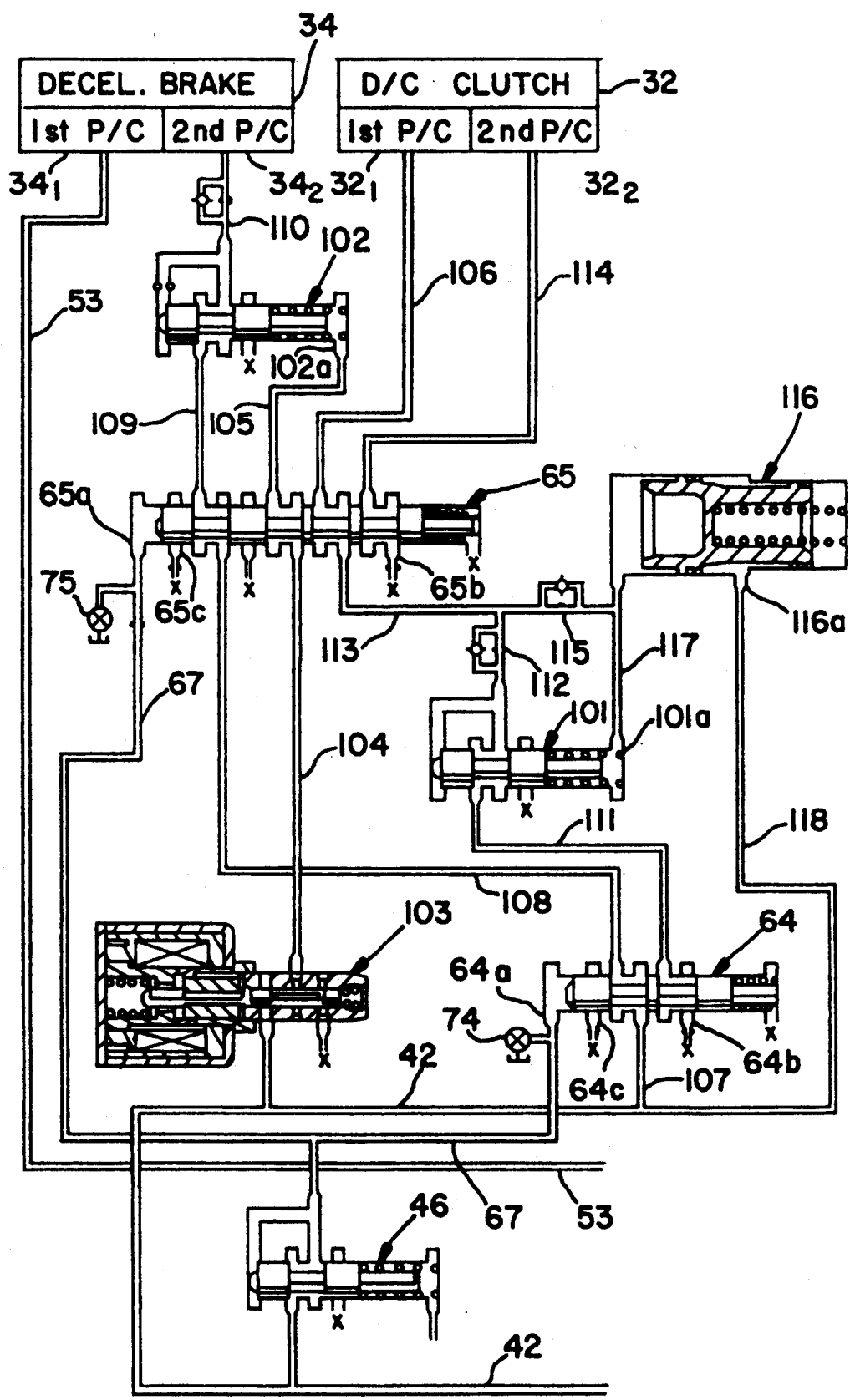

When the fourth on-off solenoid valve 74 becomes out of order and cannot be turned off, the direct connection clutch 32 is engaged irrespective of whether the fifth on-off solenoid valve 75 is on (See FIG. 8) or off (See FIG. 5) and accordingly neither first nor third can be obtained.

3) When the fifth on-off solenoid valve 75 becomes out of order and cannot be turned on.

When the fifth on-off solenoid valve 75 cannot be turned on due to break of the energizing wire or the like, the controller 160 controls the fourth on-off solenoid valve 74 in the pattern shown in the following table 7.

TABLE 7

| | 4th S/V | 5th S/V | 2nd Chamber $34_2$ | 1st Chamber $32_1$ | 2nd Chamber $32_2$ | E/B | Sub T/M |
|---|---|---|---|---|---|---|---|
| 1 | OFF | OFF | ○ | | | avail | Low |
| 2 | ON | OFF | | ○ | | avail | High |
| 3 | OFF | OFF | ○ | | | avail | Low |
| 4 | ON | OFF | | ○ | | avail | High |
| 5 | ON | OFF | | ○ | | avail | High |

First, second and third can be obtained in the same manner as when all the solenoid valves are normal since they are obtained with the fifth on-off solenoid valve 75 off in the regular state. However fourth and fifth cannot be obtained in the same manner as in the regular state since they are obtained with the fifth on-off solenoid valve 75 on in the regular state. When the fourth on-off solenoid valve 74 is turned on, the pressure can be supplied to the first hydraulic pressure chamber $32_1$ of the direct connection clutch 32 through the line 113 to shift the sub transmission mechanism 30 to the high gear speed though the engaging pressure to the first hydraulic pressure chamber $32_1$ cannot be regulated by the second linear solenoid valve 103 as can be understood from FIG. 5. Thus fourth and fifth equivalent to those obtained in the regular state can be obtained though it becomes difficult to precisely control the engaging pressure.

4) When the fifth on-off solenoid valve 75 becomes out of order and cannot be turned off.

When the fifth on-off solenoid valve 75 cannot be turned off, the controller 160 controls in the pattern shown in the following table 8.

TABLE 8

| | 4th S/V | 5th S/V | 2nd Chamber $34_2$ | 1st Chamber $32_1$ | 2nd Chamber $32_2$ | E/B | Sub T/M |
|---|---|---|---|---|---|---|---|
| 1 | OFF | ON | | linear (min) | | no | Low |
| 2 | OF | ON | | linear (max) | | avail | High |
| 3 | OFF | ON | | linear (min) | | no | Low |
| 4 | ON | ON | | linear | ○ | avail | High |
| 5 | ON | ON | | linear | ○ | avail | High |

In first, second and third, the fourth on-off solenoid valve 74 is turned on and the regulated engaging pressure is supplied to the first hydraulic pressure chamber $32_1$ of the direct connection clutch 32 through the line 104 as shown in FIG. 6. Further in first and third, the driving current to the second linear solenoid valve 103 is maximized so that the pressure in the line is minimized, whereby the direct connection clutch 32 is substantially in a disengaged state since the engaging pressure is substantially 0 and first and third can be obtained. However the engaging pressure cannot be supplied to the second hydraulic pressure chamber $34_2$ in this state and accordingly, the engine brake effect cannot be obtained in first and third.

In second, the driving current to the second linear solenoid valve 103 is minimized so that the pressure in the line 104 is maximized, whereby the direct connection clutch 32 is substantially in the engaged state and second equivalent to second in the regular state can be obtained. As for fourth and fifth, the normal control can be effected.

5) When the second linear solenoid valve 103 becomes out of order

When the second linear solenoid valve 103 becomes out of order, the engaging pressure to the first hydraulic pressure chamber $32_1$ of the direct connection clutch 32 cannot be regulated in fourth and fifth though first, second and third can be obtained in the same manner as in the regular state as can be understood from the following table 9. Accordingly the fourth on-off solenoid valve 74 is turned on and the fifth on-off solenoid valve 75 is turned off in fourth and fifth as in the case shown in table 6. Thus the engaging pressure can be applied to the first hydraulic pressure chamber $32_1$ of the direct connection clutch 32 through the line 113 to shift the sub transmission mechanism 30 to the high gear speed and fourth and fifth substantially equivalent to those obtained in the regular state can be obtained.

TABLE 9

| | 4th S/V | 5th S/V | 2nd Chamber $34_2$ | 1st Chamber $32_1$ | 2nd Chamber $32_2$ | E/B | Sub T/M |
|---|---|---|---|---|---|---|---|
| 1 | OFF | OFF | ○ | | | avail | Low |
| 2 | ON | OFF | | ○ | | avail | High |
| 3 | OFF | OFF | ○ | | | avail | Low |
| 4 | ON | OFF | | ○ | | avail | High |
| 5 | ON | OFF | | | ○ | avail | High |

As can be understood from the description above, even if one of the fourth and fifth on-off solenoid valves 74 and 75 and the second linear solenoid valve 103 becomes out of order, gear-shifting substantially equivalent to that in the regular state can be effected by controlling the other solenoid valves in the manner described above, whereby safety in control of the automatic transmission 1 can be improved.

Though, in the embodiment described above, the direct connection clutch 32 has first and second hydraulic pressure chambers $32_1$ and $32_2$, the method of gear-shifting in case of failure in one of the aforesaid solenoid valves can be applied to the transmission mechanism having a direct connection clutch without second hydraulic pressure chamber $32_2$. In this case, first and third can also be obtained by suitable control of the other solenoid valves 75 and 103 in case of failure where the fourth on-off solenoid valve 74 cannot be turned off.

Changes in the engaging pressures to the second hydraulic pressure chamber $34_2$ of the deceleration brake 34 and the first hydraulic pressure chamber $32_1$ of the direct connection clutch 32 during 1–2 upshift will be described, hereinbelow, for the case of the regular state, the case where the fourth on-off solenoid valve 74 cannot be turned on and the case where the fifth on-off solenoid valve 75 cannot be turned off.

As shown in FIG. 10, in the regular state, the engaging pressure to the deceleration brake 34 is reduced while the engaging pressure to the first hydraulic pressure chamber $32_1$ is increased stepwise. The plateau pressure is produced by the control valve 101 which receives the control pressure from the accumulator 116, and the engaging pressure in the line 104 regulated by the second linear solenoid valve 103 (linear output pressure) is held maximum.

In the case where the fourth on-off solenoid valve 74 cannot be turned off, since the plateau pressure cannot be produced by the accumulator 116 and the second linear solenoid valve 103, the linear output pressure is once reduced to the plateau pressure from the maximum pressure and then maximized after completion of engagement of the direct connection clutch 32 as shown in FIG. 11.

In the case where the fifth on-off solenoid valve 75 cannot be turned on, since the plateau pressure cannot be produced by the accumulator 116 and the second linear solenoid valve 103, the linear output pressure is once increased to the plateau pressure from the minimum pressure and then maximized after completion of engagement of the direct connection clutch 32 as shown in FIG. 12.

What is claimed is:

1. A control system for an automatic transmission having an hydraulic circuit which controls engaging pressures of friction coupling elements characterized in that said hydraulic circuit comprises a first hydraulic passage having a hydraulic pressure control means including an accumulator, a second hydraulic passage which is provided in parallel to the first hydraulic passage and is provided with an electrically controlled hydraulic pressure control means, and a shift valve which selectively connects a predetermined friction coupling element to either of the first hydraulic passage or the second hydraulic passage.

2. A control system for an automatic transmission which has a main transmission mechanism and a sub transmission mechanism and a hydraulic circuit for controlling supply of engaging pressures to friction coupling elements in the main transmission mechanism and the sub transmission mechanism characterized in that said hydraulic circuit is provided, for a predetermined friction coupling element of the sub transmission mechanism which is involved in a predetermined gear-shifting where the main transmission mechanism and the sub transmission mechanism shift in opposite directions, with a first hydraulic passage having a hydraulic pressure control means including an accumulator, a second hydraulic passage which is provided in parallel to the first hydraulic passage and is provided with an electrically controlled hydraulic pressure control means, and a shift valve which connects the predetermined friction coupling element to the second hydraulic passage during the predetermined gear-shifting and to the first hydraulic passage during gear-shiftings other than the predetermined gear-shifting.

3. A control system as defined in claim 2 further comprising a control means which causes the hydraulic pressure control means in the second hydraulic passage to feedback-control the engaging pressure supplied to the predetermined friction coupling element so that the gear ratio in the sub transmission mechanism changes in step with the change in the gear ratio in the main transmission mechanism during said predetermined gear-shifting.

4. A control system as defined in claim 3 in which said electrically controlled hydraulic pressure control means in the second hydraulic passage comprises a first solenoid valve which is an on-off solenoid valve and said second hydraulic passage comprises a pressure regulating circuit having a second solenoid valve which regulates the engaging pressure supplied to the predetermined friction coupling element.

5. A control system as defined in claim 4 in which said pressure regulating circuit once holds the engaging pressure supplied to said predetermined friction coupling element at a predetermined increased pressure and then maximizes it.

6. A control system as defined in claim 4 in which said control means causes, when one of the first and second solenoid valves is uncontrollable, the other to control supply of the engaging pressure to the predetermined friction coupling element.

* * * * *